United States Patent [19]

Leritz

[11] Patent Number: 4,466,626
[45] Date of Patent: Aug. 21, 1984

[54] VELOCIPEDE

[76] Inventor: James P. Leritz, 4210 Balboa St. #202, San Francisco, Calif. 94121

[21] Appl. No.: 325,030

[22] Filed: Nov. 25, 1981

[51] Int. Cl.³ .......................................... B62M 29/00
[52] U.S. Cl. ................................ 280/12.14; 280/7.14; 280/21 A
[58] Field of Search ............... 280/7.12, 7.14, 7.17, 280/9, 11, 12 A, 12 B, 12.1, 12.11, 12.12, 12.13, 12.14, 216, 219, 16, 21 R; 180/16, 186, 206, 207, 194, 195, 196, 227, 183, 15; 188/8

[56] References Cited

U.S. PATENT DOCUMENTS

| 473,434 | 4/1892 | Stevens | 280/12.14 |
|---|---|---|---|
| 504,625 | 9/1893 | Schmid | 280/12.14 |
| 512,690 | 1/1894 | Firth | 280/12.14 |
| 524,349 | 8/1894 | Putrow | 280/12.14 |
| 559,202 | 4/1896 | Paulson | 280/12.14 |
| 561,405 | 6/1896 | Leahan | 280/12.14 |
| 576,354 | 2/1897 | Vose | 280/12.14 |
| 586,412 | 7/1897 | Anderson | 280/12.14 |
| 618,251 | 1/1899 | Meyer | 280/12.14 |
| 633,030 | 9/1899 | Nelson | 280/12.14 |
| 848,488 | 3/1907 | Nobles | 280/12.14 |
| 893,867 | 7/1908 | Pereyra | 280/12.14 |
| 1,012,627 | 12/1911 | Gosline | 280/12.14 |
| 1,015,270 | 1/1912 | Borg et al. | 280/12.14 |
| 1,197,764 | 9/1916 | Pressman | 280/12.14 |
| 1,250,739 | 12/1917 | Wells | 280/12.14 |
| 1,261,204 | 4/1918 | Barton | 280/12.14 |
| 1,296,531 | 3/1919 | Landby | 280/12.14 |
| 1,324,342 | 12/1919 | Doroszuk | 280/12.14 |
| 1,385,251 | 7/1921 | Jenkins | 280/12.14 |
| 1,391,506 | 9/1921 | Riley | 180/194 |
| 1,538,633 | 5/1925 | Goodrich | 280/12.14 |
| 1,599,915 | 9/1926 | Normandin | 280/12.14 |
| 2,466,222 | 4/1949 | Foner | 280/12.14 |
| 3,295,619 | 1/1967 | Plank | 180/194 |
| 3,630,301 | 12/1971 | Henricks | 180/6 A |
| 3,771,807 | 11/1973 | Porsche | 280/16 |
| 3,799,565 | 3/1974 | Burtis | 280/16 |
| 3,811,704 | 5/1974 | Gregoric | 280/216 |
| 3,814,198 | 6/1974 | Seiler | 180/6 A |
| 3,833,233 | 9/1974 | Sugiyama | 280/12.14 |
| 3,941,075 | 3/1976 | Rupenian | 280/216 |
| 4,131,292 | 12/1978 | Swech | 280/14 |
| 4,159,105 | 6/1979 | Vander Laan | 180/227 |
| 4,168,841 | 9/1979 | Uhlyarik | 180/196 |
| 4,219,207 | 8/1980 | Muir | 188/8 |

FOREIGN PATENT DOCUMENTS 49039 2/1911 Austria ......................... 280/12.14

Primary Examiner—Joseph F. Peters, Jr.
Attorney, Agent, or Firm—Warren J. Krauss

[57] ABSTRACT

A vehicle for travel over ice and snow. The vehicle has steerable runner or ski means and a driving or traction wheel for producing traction. The traction wheel is selectively retractable from the surface over which the vehicle is travelling. The drive means for retracting the traction wheel are the same means which transmit power to the traction wheel. The vehicle is also equipped with multiple-point braking means.

6 Claims, 46 Drawing Figures

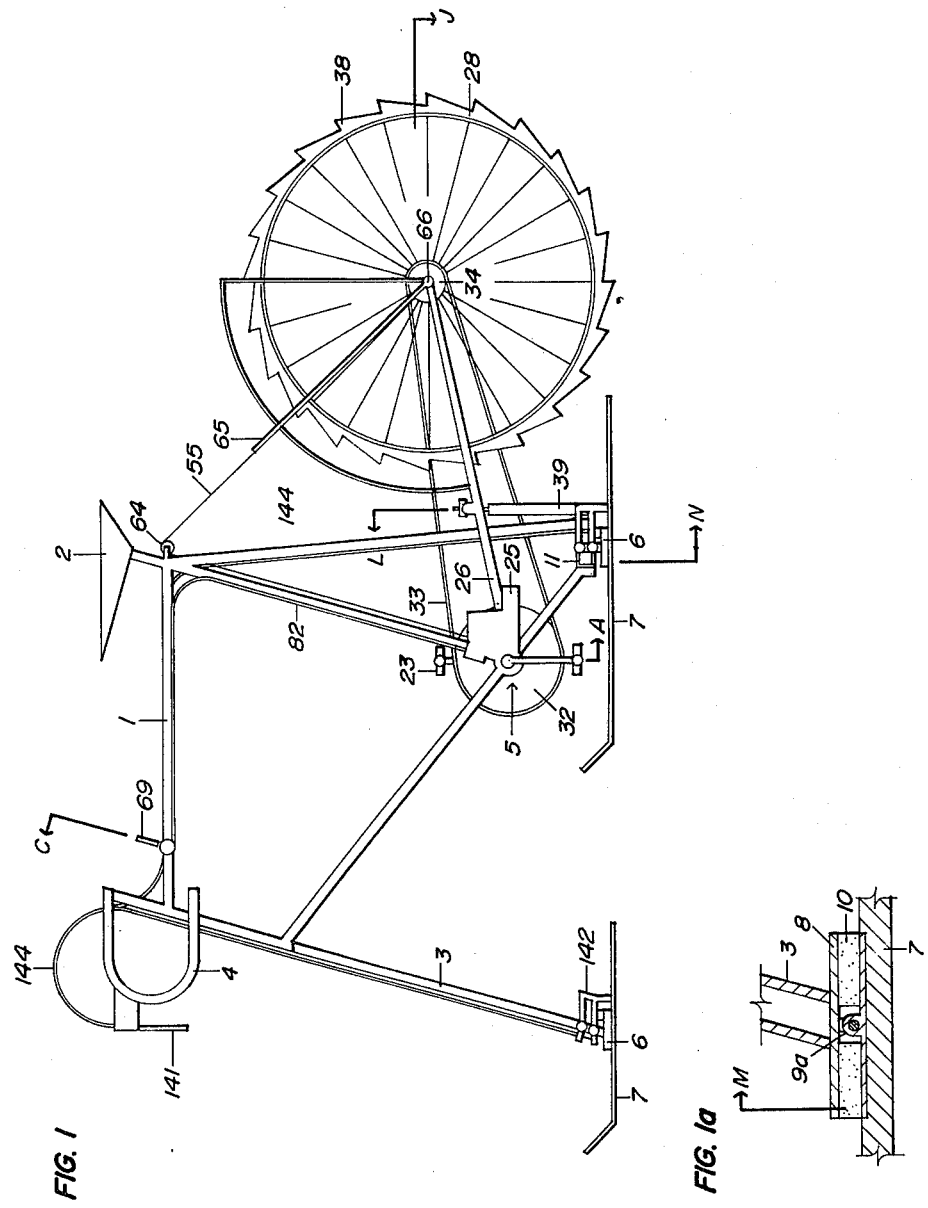

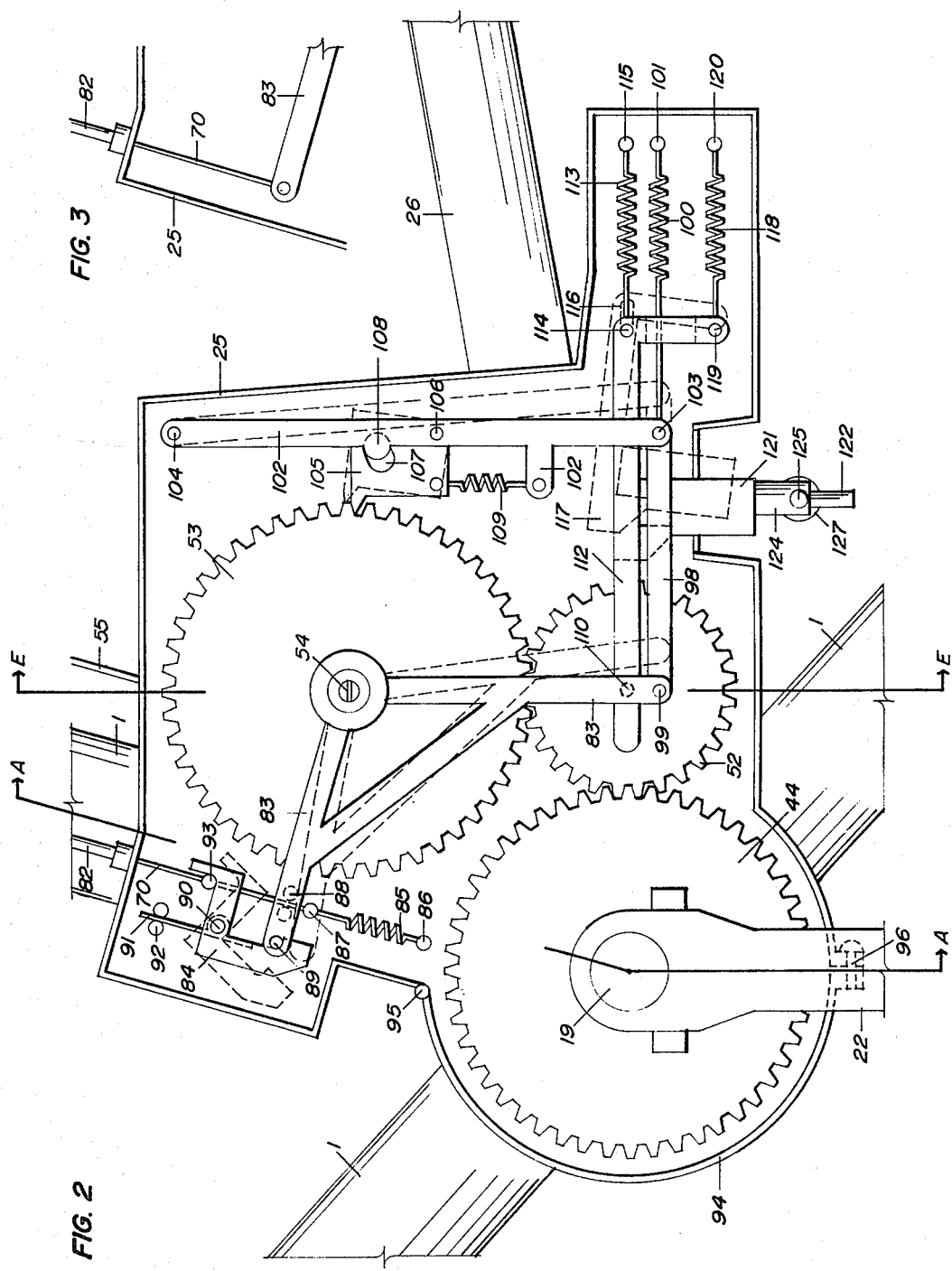

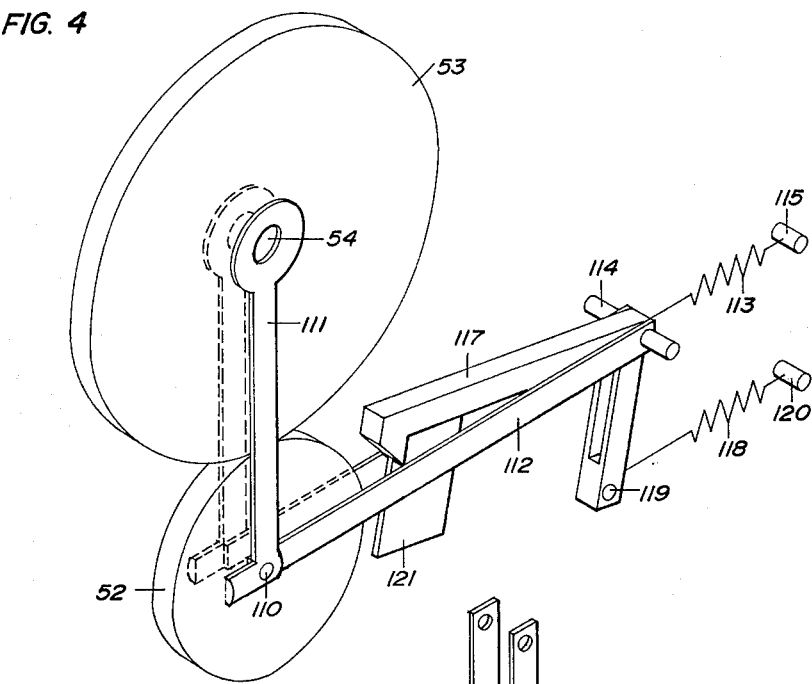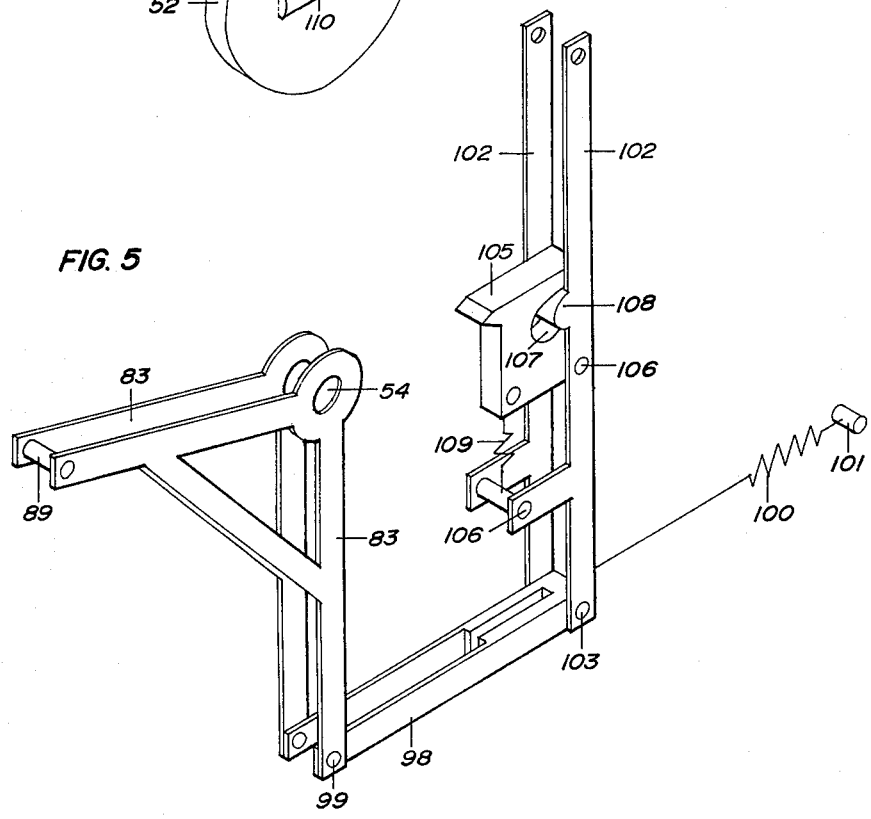

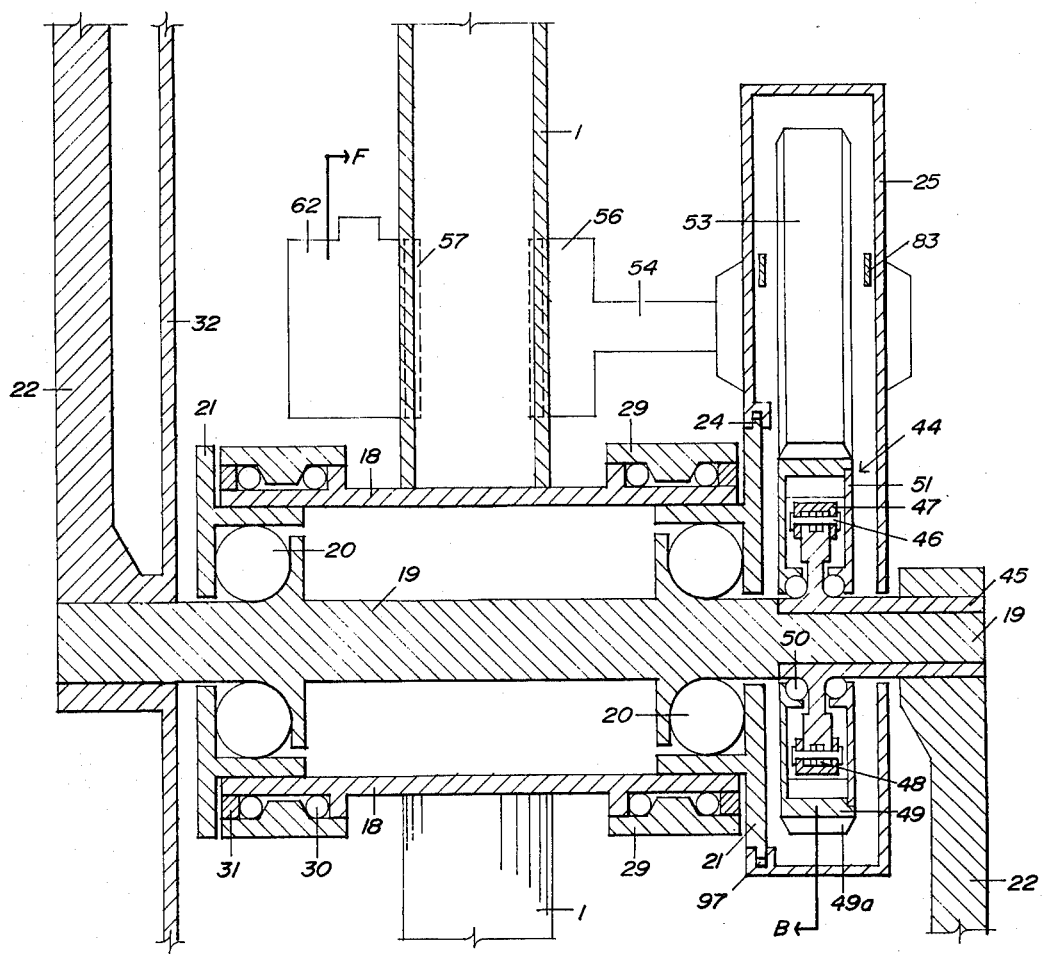
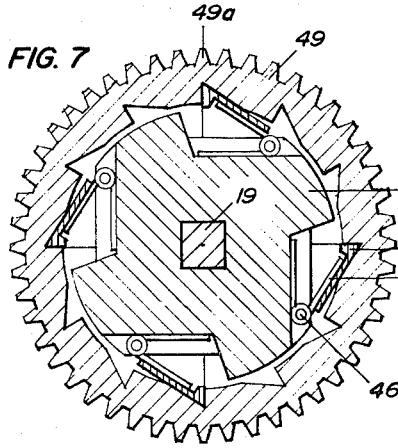
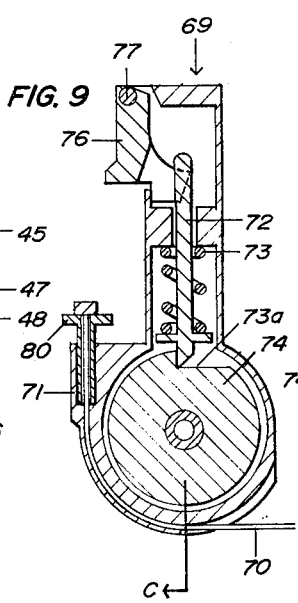
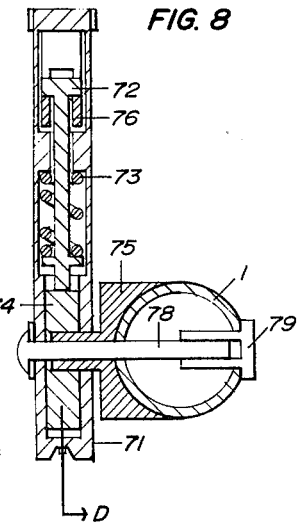

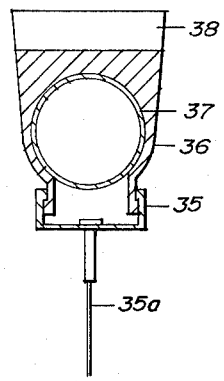
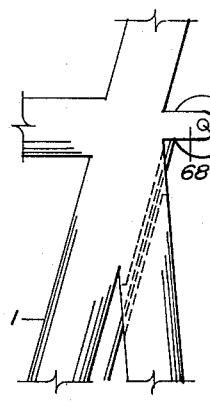
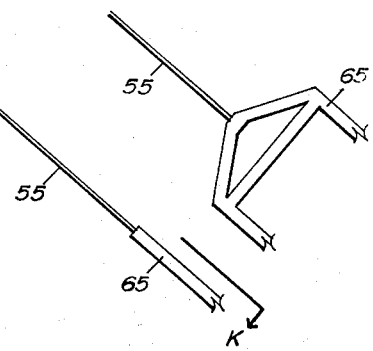
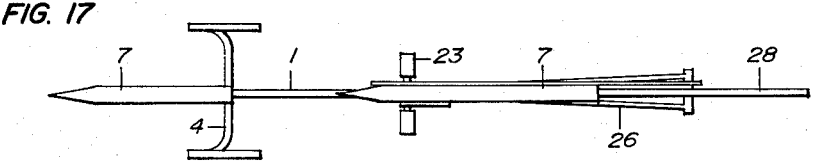
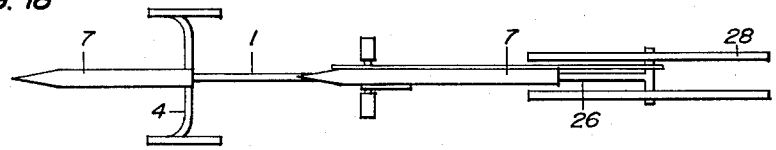
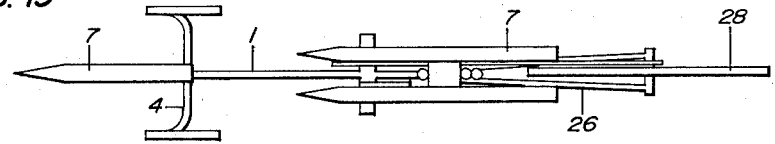
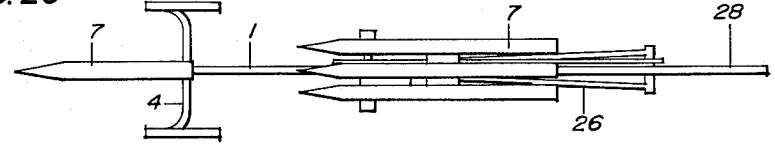
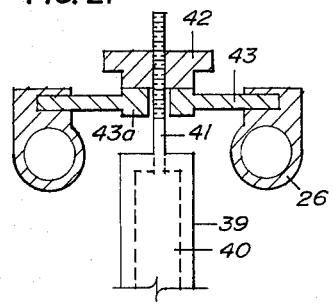
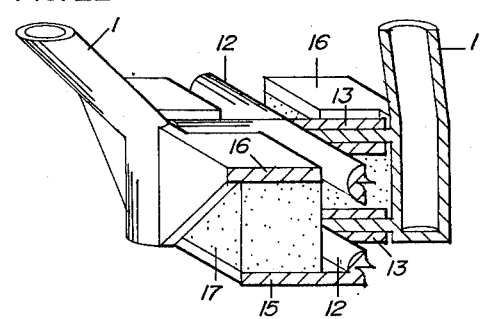

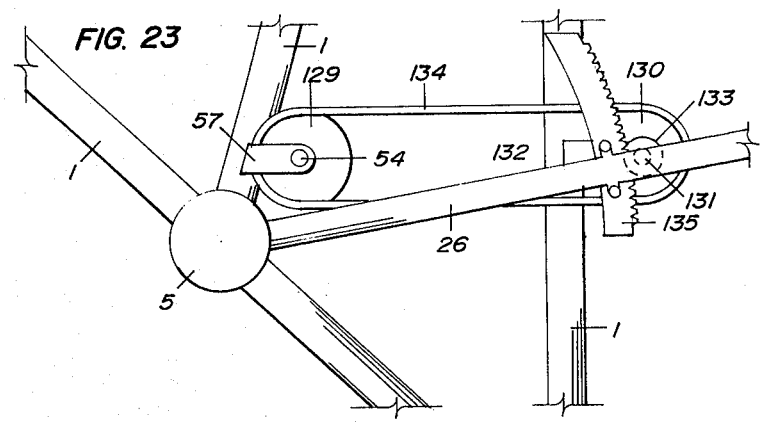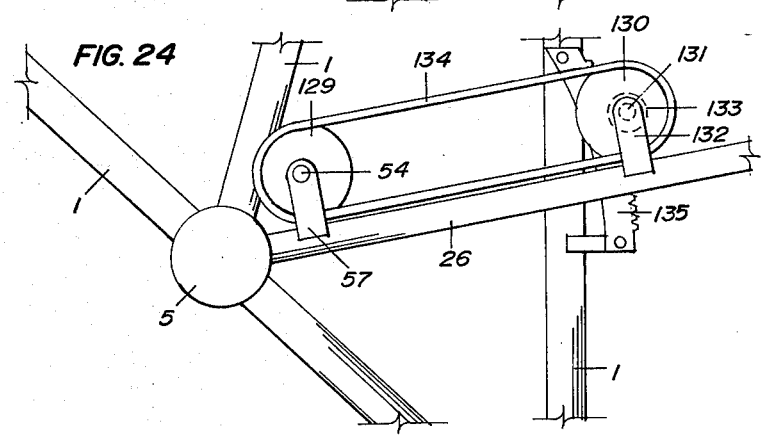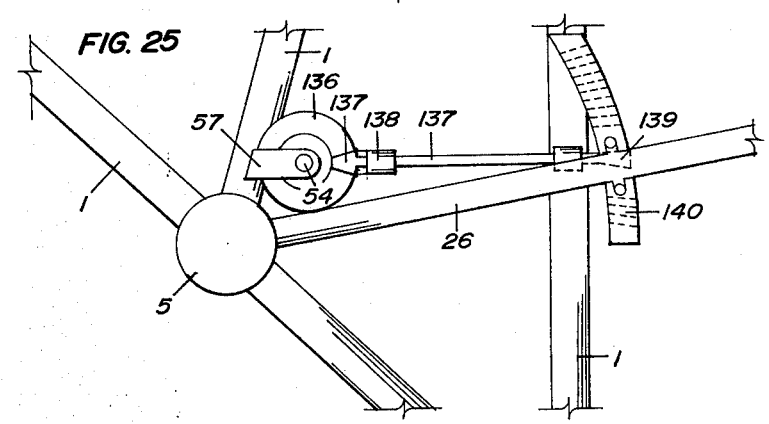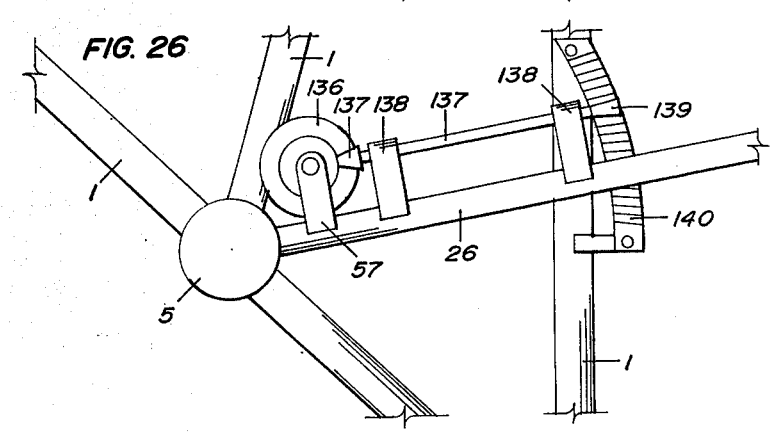

VELOCIPEDE

BACKGROUND OF THE INVENTION

This invention relates to a velocipede. More specifically, it relates to a vehicle for travel over snow and ice.

A vehicle is provided which can be efficiently propelled by a human being and easily maneuvered over ice and snow and controlled without awkward movements or unusual applications of force by the driver.

Such a system has eluded the transportation industry for some time. It has apparently been difficult for vehicle manufacturers to produce a sturdy, economically fabricated and serviceable vehicle which actually works efficiently and is not merely a novelty item. Numerous attempts have been made in the past to accomplish the purposes of the present invention, as shown by the prior art, but only certain individual functions have been addressed and accomplished by any of the prior art inventions.

U.S. Pat. Nos. 473,434; 504,625; 524,349; 559,202; 561,405; 576,354; 586,412; 633,030; 848,488; 893,867; 1,012,627; 1,015,270; 1,324,342; 1,197,764; 1,250,739; 1,296,531; 1,385,251; 1,538,633; 1,599,915; 2,466,222; 3,630,301; 3,814,198; 3,833,233; and 4,131,292; to Stevens; Schmid; Putrow; Paulson; Leahan; Vose; Anderson; Nelson; Nobles; Pereyra; Gosline; Borg et al.; Doroszuk; Pressman; Wells; Landby; Jenkins; Goodrich; Normandin; Foner; Hendricks; Seiler; Sugiyama; and Swech respectively, teach certain of the desired individual concepts, per se, of the present invention.

However, none of the cited patents addresses the totality of the multiple functions and structure for performing such functions which are embodied in the present invention. For example, not one of the prior art patents show a driving wheel retraction system which is powered by the same rider crank means which powers the drive wheel. Further, none of the prior art patents teach the suspension system, the steering system, or the braking system of the present invention.

SUMMARY OF THE INVENTION

The instant velocipede comprises a frame straddleable by a rider with a seat, steering bars, and pedals through which a rider can control and power the vehicle. The vehicle is equipped with steerable ski or runner means on the forward and rearward portions thereof for supporting the vehicle upon a snow or ice surface. A traction wheel is provided for selectively engaging the surface upon which the vehicle is supported and for supplying traction for moving the vehicle on a flat or upwardly inclining surface. The traction wheel is powered by crank and pedal means to which force is applied by the driver. The same crank and pedal means which power the traction wheel also power the retraction mechanism which lifts the traction wheel out of engagement with the support surface upon manual movement by the driver of a control means mounted upon the vehicle frame. The vehicle is equipped with front and rear brake means which are conveniently controlled by the hands of the driver.

One of the objects of this invention is to provide a velocipede for use on snow and ice which has a traction wheel powered by a pedal crank mechanism and a wheel retraction system which is also powered by the same pedal crank mechanism.

A further object of this invention is to provide a velocipede with a wheel retraction system providing automatic disengagement of the wheel retraction mechanism when the traction wheel has reached a preselected distance from the support surface.

A still further object is to provide a velocipede having a shock absorbing system in the traction wheel retraction system for gentle re-engagement of the traction wheel on the support surface.

Still another object of the present invention is to provide a velocipede having a retraction system powered by the pedal crank mechanism and which allows continuous turning of the traction wheel throughout the retraction process.

Yet another object of the present invention is to provide a velocipede having a traction wheel constantly biased toward engagement with the support surface to provide traction force to the vehicle regardless of the support surface terrain and elevation of the traction wheel.

A still further object of the present invention is to provide a wheel retraction means for a velocipede in which the retraction height of the traction wheel is selectively adjustable.

Yet another object of this invention is to provide a velocipede having a ski mounting system which connects to the frame at only one point and which allows rotation of the skis about a transverse axis, limits the amount of axial rotation of the skis, and returns the skis to a horizontal position in the absence of external force.

Another object of the present invention is to provide a rear steering system for a velocipede which utilizes laterally pivoting link elements to coordinate movement of the front and rear skis.

The accompanying drawings show, by way of illustration only, the preferred embodiments of the present inventions and the principles thereof It should be recognized that other embodiments of the invention, applying the same or equivalent principles, may be utilized and that structural changes may be made as desired by those skilled in the art, without departing from the spirit of the invention.

BRIEF DESCRIPTION OF THE DRAWINGS

FIG. 1 is an overall side elevation of the instant velocipede showing generally the traction, steering, braking, and wheel retraction systems;

FIG. 1a is an enlarged section of a portion of the front ski mounting system shown in FIG. 1;

FIG. 2 is an enlarged elevation, with front panel of housing removed, of the traction wheel retraction system;

FIG. 3 is a partial elevation of an alternate connection means for the retraction system;

FIG. 4 is an isometric showing of a portion of the wheel retraction means shown in FIG. 2;

FIG. 5 is an isometric showing of a portion of the wheel retraction system shown in FIG. 2;

FIG. 6 is a partial sectional view of the wheel retraction system taken along a line A in FIGS. 2 and 1;

FIG. 7 is a sectional view of the drive sprocket and primary retraction gear, taken along the line B in FIG. 6;

FIG. 8 is a sectional view of the retraction system control lever taken along the line C in FIG. 1 and in FIG. 9;

FIG. 9 is another section of the control level taken along the line D in FIG. 8;

FIG. 14 is a sectional view of the traction wheel and tube assembly taken along the line J of FIG. 1;

FIG. 15 is an enlarged partial elevation of a cable and pulley means for the wheel retraction system;

FIG. 16 is a partial plan view of the cable and rigid fork wheel attachment means viewed generally along the line K in FIG. 15;

FIGS. 17, 18, 19, and 20 illustrate, in reflected plan, various alternative ski configurations for the instant velocipede. The preferred arrangement is shown in FIG. 19;

FIG. 21 is a sectional view of the retraction means height adjustment mechanism taken along the line L in FIG. 1;

FIG. 22 is a partial sectional view of the main frame suspension at the rear ski;

FIGS. 23, 24, 25, and 26 are partial elevations of alternative wheel lifting mechanisms for the trailing arm of the wheel retraction system;

FIG. 32 is a sectional view of the ski suspension system at the front ski, taken along a line M in FIG. 1a. FIG. 32 is also a sectional view of the rear ski suspension system when a single rear ski is employed, as in FIGS. 17 and 18;

FIG. 38 is a plan view of FIG. 37, viewed generally along the line P in FIG. 37;

DETAILED DESCRIPTION

Figure 10:
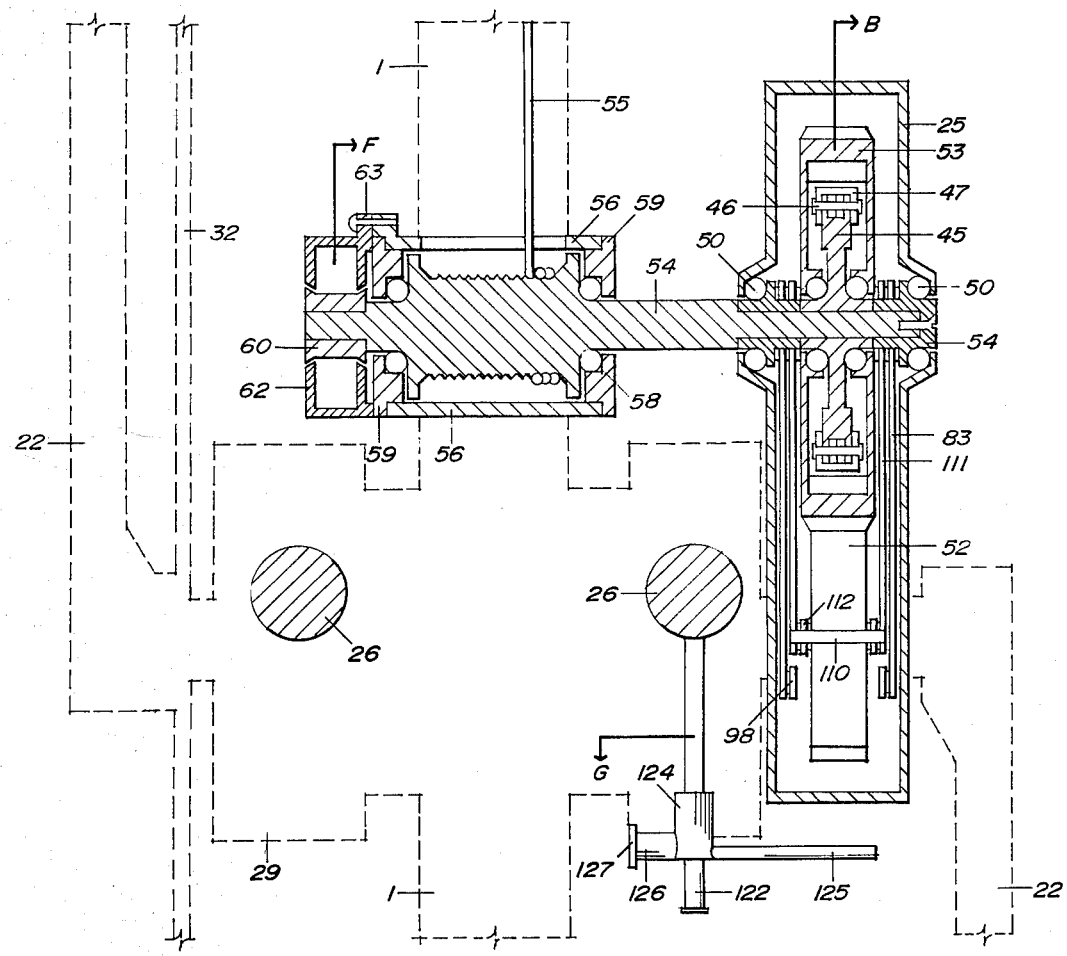
FIG. 10 is a partial sectional view of the wheel retraction system showing the final gear and winding drum assemblies, taken along the line E in FIG. 2.

With reference to FIG. 1 in the drawings, the basic structure and principles of operation of the instant invention may be readily appreciated.

The support structure for the vehicle is provided by main frame means 1. The frame means are composed generally of vertical and horizontal elements securely connected, as by welding or the like, to provide strong support for the body of the driver and for attachment of various components of the invention. At 2 is a suitable seat for the driver, and at 3 is a generally vertically disposed steering column conventionally mounted in main frame 1 and affixed to suitable steering bars or handles 4. At 5 is shown generally a pedal crank mechanism for transferring driver power to both the traction wheel and the retraction means for said traction wheel, as will be explained hereinafter.

With concurrent reference to FIGS. 1 and 2, the lower portion of the steering column 3 carries a ski mounting assembly, shown generally at 6, for mounting skid means 7. In the preferred arrangement, the skid means take the form of snow skis. As shown more particularly in FIG. 1a, the ski mounting assembly 6 comprises rigid plate means 8 fixed to the steering column 3 by means of a transverse shaft means 9 fixed to the plate means. Sleeve means 9a pivotally circumscribe the transverse shaft means 9 and are rigidly connected to the ski means 7.

Resilient means such as pads or compression springs 10 are located about the transverse shaft means 9 betwixt the ski means 7 and the plate means 8. Upon movement of the ski means 7 to accomodate variations in terrain, resilient means 10 provide limited controlled relative movement between the fixed plate means 8 and the ski means 7. The resilient means are sufficient to return the ski means to the balanced position shown in FIG. 1a, absent the application of external forces.

The preferred embodiment of the instant invention includes two parallel rear skis and a centrally placed traction wheel as shown in reflected plan in FIG. 19. Other arrangements of rear skis and traction wheel means are illustrated in reflected plan in FIGS. 17, 18, and 20. The embodiment shown in FIG. 17 includes a single rear ski and a single traction wheel, each of which is located on the longitudinal axis of the vehicle. FIG. 18 illustrates an embodiment similar to that shown in FIG. 17 which, however, includes two laterally disposed traction wheels. FIG. 20 shows an embodiment which includes a primary-support rear ski located centrally, stabilizing rear skis located on either side of the central ski, and a centrally disposed traction wheel. All embodiments herein described include a front ski centrally located at the base of the steering spindle.

Figure 34:
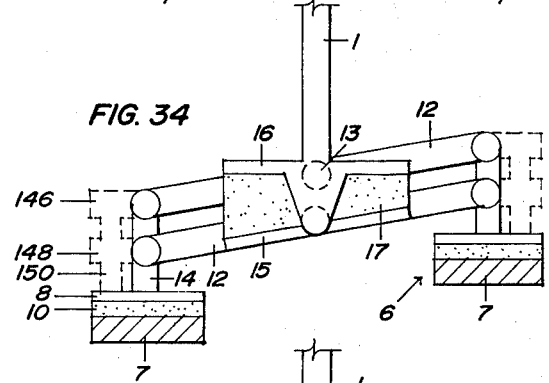

Shown generally at 11 in FIG. 1 is the suspension system for the rear ski and traction wheel means. With concurrent reference to FIGS. 1, 22, and 34, the preferred suspension system may be readily appreciated.

A pair of laterally extending suspension arms 12 are pivotally connected to the main frame means 1 at sleeves 13. As most clearly shown in FIG. 34, the lateral ends of the suspension arms 12 are pivotally connected to vertical posts 14. The vertical post means 14 are fixedly attached to the plate means 8 of the ski mounting assemblies 6. Lower suspension arm means 12 and sleeves 13, as shown in FIG. 22, carry horizontal flange means 15 extending outwardly from either side of the sleeves 13. Horizontal flange means 16 are rigidly affixed to the frame means 1.

Resilient compression means, such as pads or coils 17, are disposed between the flange means 15 and 16 for absorbing shock, for limiting movement of the suspension arms 12 relative to the frame means 1, and for maintaining contact between ski means 7 and the general surface. In the preferred embodiment of FIG. 34, the suspension arms 12 are continuous side to side; thus the movements of the ski means 7 on either side of the main frame 1 are interdependent.

Figure 32:
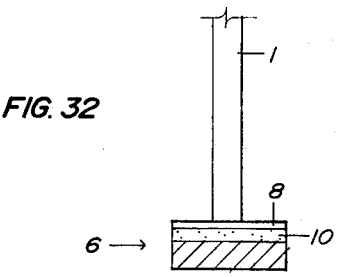

FIG. 32 shows the preferred ski suspension system for the front ski of the vehicle, as well as an alternative suspension system for the rear ski means when only one, centrally located, ski is desired.

Figure 33:
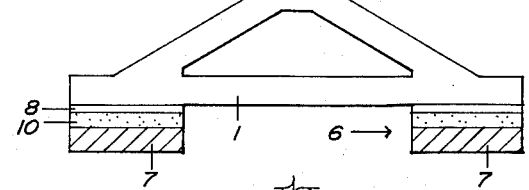
FIGS. 33, 34, 35, and 36 are partial elevations of alternative rear ski suspension systems when multiple skis are employed, viewed generally along the line N in FIG. 1. The preferred arrangement is shown in FIG. 34.

In FIG. 33, two ski mounting assemblies 6 are provided as in FIG. 32. However, such assemblies are rigidly connected by means of single suspension arm 12 from the main frame means 1.

Figure 35:
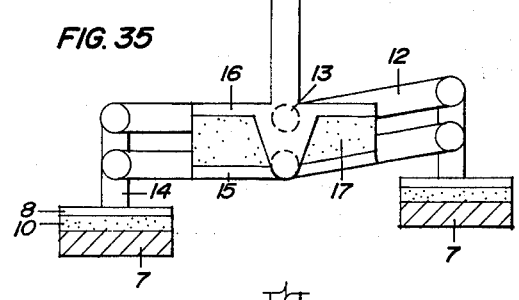

In the embodiment shown in FIG. 35, the suspension arms 12 are discontinuous end to end, thus the up-and-down motions of the side-by-side skis 7 are independent.

Figure 36:
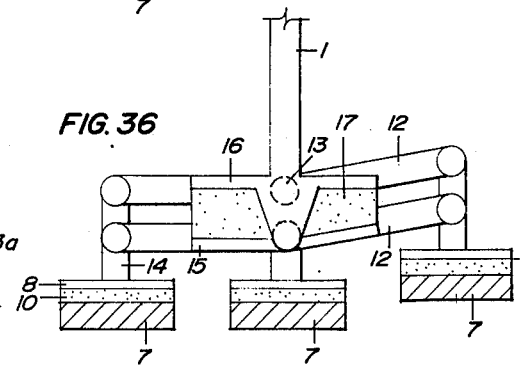

In the embodiment of FIG. 36, a central ski 7 is rigidly suspended from the frame means and a pair of outer skis are independently suspended in the manner illustrated by FIG. 35.

With particular reference to FIGS. 1 and 6, the means for providing propulsion to the instant velocipede may be understood.

The pedal crank assembly 5, shown driven by the pedal 23 in FIG. 1, includes crank cylinder means 18, fixedly attached to the mainframe 1. A crankshaft 19, equipped with pedal cranks 22 to which the pedals 23 are rotatably attached, is disposed for rotation within the crank cylinder means and is supported by means of crankshaft bearings 20. Suitable end caps 21 are sealingly threaded into the crank cylinder means as shown. The rightwardmost end cap 21 (as shown in FIG. 6) is provided with a circular flange 24 which is adapted to coact with a circular groove, having a sealing gasket 97, in housing means 25 of the wheel retraction mechanism, as will be explained more fully hereinafter.

Each of the two parallel trailing arms 26, shown supporting the traction wheel in FIG. 1, is provided with a circular end portion 29, which is shown, in FIG. 6, supportingly circumscribing the crank cylinder means 18. The ring portions 29 are bifurcated for facile assembly and disassembly to the crank cylinder. The trailing arm ring portions are rotatably supported upon bearings 30, which bearings are held in place by end rings 31.

Affixed to the leftward portion of the crankshaft 19, as shown in FIG. 6 is front sprocket wheel 32, over which is trained a drive chain 33 which drivingly transmits pedal crank power to the rear sprocket wheel 34, which is fixed for rotation with the traction wheel 28. In a known fashion, various combinations and sizes for front and rear sprocket wheels may be provided to selectively control the gear ratio and mechanical advantage obtained for any of a plurality of terrain conditions. It should also be noted that the rear sprocket wheel 34 is connected to the traction wheel 28 by means of a conventional ratchet system which allows traction of the traction wheel by the chain in one direction only.

With reference to FIG. 14, the traction wheel 28 may be viewed in more detail. The wheel is comprised of a rim portion 35 supported by a plurality of spokes 35a, which are in turn connected to the wheel hub. The rim is shaped so as to allow engagement with a resilient material torus element 36 having an inner tube 37. The resilient torus element is equipped with teeth or spikes 38 on its periphery and is readily replaceable so that suitable traction elements may be provided for any of a plurality of different terrain conditions, running from sheer ice to deep, loose-packed snow.

By reference to FIG. 1, it will be noted that the trailing arms 26 are provided with adjustable shock absorbing means 39 which are mounted between the trailing arms and the lower portion of main frame 1. The shock absorbing means 39 constantly bias the traction wheel downwardly towards the support surface while acting to dampen sudden movements of the traction wheel as the velocipede traverses the riding surface. In FIG. 21, the assembly 39 is shown to be provided with an adjustment means for selectively tensioning the spring means.

The adjustment system consists of a threaded bolt 41 which is attached for movement with a spring 40, shown in phantom. A wing nut 42 is threadably secured to the bolt 41 and coacts with a central hub portion 43a of the cross member 43. The cross member elements are pivotally affixed to the trailing arms 26, as shown.

The instant vehicle is suitably provided with powered retraction means for selectively lifting the traction wheel 28 off of the support surface and for holding it at any of a plurality of preselected elevations. The wheel retraction system is generally illustrated in FIGS. 2, 6 and 7.

Power for retracting the traction wheel comes from the same pedal crank assembly which is used to drive the traction wheel 28. Primary gear means 44 are fixed for rotation, in only one direction, upon the crankshaft 19. An internal ratchet mechanism permits counterrotation of the pedal cranks without rotation of the primary gear means. A cylindrical sleeve element 45 is keyed to the crankshaft 19 and provides attachment sites for pawl axles 46 upon which are mounted pawls 47 and pawl springs 48. These features are particularly apparent in FIGS. 6 and 7.

A primary gear shell 49 is rotatably supported upon ball bearings 50, as best shown in FIG. 6. The shell is provided with teeth 49a upon the outer periphery thereof and with ratchet means on its interior peripheral surface. A closing cap 51 is removably fitted to the outer axial end of the gear shell and provides support for the shell via its mounting engagement with the ball bearings 50.

The ratchet construction detailed in FIG. 7 permits the counterrotation (clockwise in FIG. 2) of the crankshaft 19 without rotation of the primary gear 44 and without effect upon the retraction system. On the other hand, positive rotation of the crankshaft (counterclockwise in FIG. 2) causes the primary gear 44 to rotate and to transmit power through pinion gear means 52, shown in FIG. 2, to final gear means 53.

Final gear means 53 have a construction similar to that of the primary gear 44. It is mounted by internal ratchet means upon a winding shaft 54, shown clearly in FIGS. 2, 6, 10 and 11. The winding shaft 54 is slotted and contains a spiral groove adapted to receive a retraction cable 55. The shaft is mounted within a housing 56 which is, in turn, secured to the main frame 1 by means of suitable brackets 57.

Figure 11:
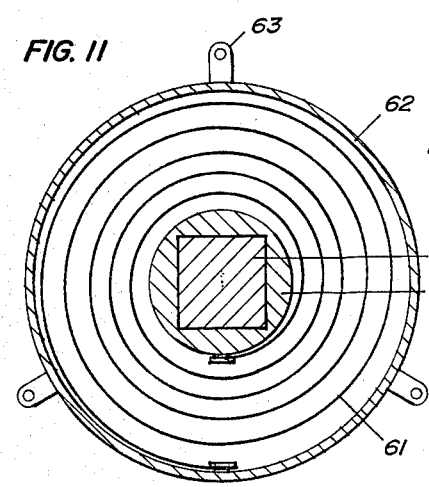
FIG. 11 is a sectional view of the coil spring tensioning means of the winding spool taken along the line F in FIG. 10.

The winding shaft 54 is rotatably mounted upon bearings 58 which are retained within bearing cups 59, threadably mounted upon the housing 56. A spool 60 is key mounted to the winding shaft 54, as shown most particularly in FIGS. 10 and 11. A flat coil spring 61, best shown in FIG. 11, is mounted within a spring housing 62 and is connected at one end thereof to the spool 60. The other end of the coil spring is anchored to the housing 62. Flanges 63 are provided for connecting the housing 62 to the winding gear housing 56 as best shown in FIG. 10. The described winding assembly permits a tendency toward constantly biased rotation (counterclockwise in FIG. 2) of the winding shaft 54 to prevent slackening of the cable 55, without reference to the position of the traction wheel 28.

The retraction cable 55 is secured at one end thereof to the winding shaft 54 and extends through an opening in the housing 56 where it leads around a pulley 64 (see FIGS. 1 and 15) to a rigid fork 65 which fork is liftingly connected to the trailing arms 26, at their rearward terminus. Portions of the fork 65 are pivotally mounted about points 66 on the trailing arms 26. The pulley 64 is rotatably mounted upon an axle 67 which is secured to the main frame by means of brackets 68, as clearly shown in FIG. 15.

Power for the operation of the traction wheel retraction system is supplied by the driver of the vehicle. The driver also controls the engagement of the retraction means by simple manual controls.

By reference to FIGS. 1, 8 and 9, the retraction controls may be appreciated. Control lever means 69 are provided for winding a control cable 70 about a control winding drum 71. With the lever positioned as shown in FIG. 9, a control shaft 72 is forced by means of spring means 73 into a control detent 73a in a rotating disc 74. With the shaft disposed in the detent, forward rotation (counterclockwise in FIG. 9) of the lever relative to the disc 74 is prevented.

As shown in FIG. 9, the disc 74 is keyed to the support element 75 which is, in turn, attached fixedly to the main frame 1 by means of a suitable fastening means, such as a bolt and nut combination 78, 79. The control cable 70 passes through a conventional hollowed screw means 80 and is fixed for rotation with the winding drum 71 of the lever 69. Minor adjustments of the length of the control cable 70 may be readily accomplished by turning of the screw means 80. The control lever means include a control trigger 76 which is pivotably mounted at 77. Depression of the trigger forces the control shaft 72 upwardly against the bias of spring 73 to selectively pull the shaft tip 72 out of the detent 73a to permit the disc to rotate and affect the length of the control cable.

The control cable 70 is suitably threaded through a protective flexible tubing 82 which, as best seen in FIG. 1, extends from the control lever to the retraction housing 25. The tubing ends are fixed with respect to the main frame such that the control cable 70 moves relative to the tubing 82 and movement of one end of the cable causes corresponding movement of the other end. In FIG. 2, one may see the distal connection of the tubing 82 and the control cable 70 at the wheel retraction system. With particular reference to FIG. 2, the distal end of the cable 70 passes through locking means 84 and through the lever 83 to fixed attachment to a spring 85 which is, in turn, attached at 86 to the retraction housing 25. FIG. 3 shows an alternate arrangement wherein the cable 70 is connected directly to the lever 83.

It may be readily seen that clockwise rotation of the control lever 69, as shown in FIG. 9, would pull the control cable 70 upwardly, as shown in FIG. 2, to cause a stop means 87, fixed to the cable, to engage lever stops 88, fixed upon lever 83, to cause lever 83 to rotate in a clockwise direction with respect to the winding shaft 54, as shown in FIG. 2.

In the orientation of elements shown in FIG. 2, the axle 89, attached to the lever 83, has moved clockwise away from a ledge portion of the locking lever 84, permitting movement thereof. The locking lever is pivotally mounted to the housing at a point 90 and is constantly biased for counterclockwise rotation by means of a spring 91 which is attached to the housing 25 by clamping means 92.

With reference to FIGS. 1, 9 and 2, counterclockwise rotation of the control lever 69 loosens the cable 70 and permits the spring 85 to move the stop 93, fixed to the cable, to engage and force the locking lever 84 to rotate into the position shown by dotted lines in FIG. 2 to thereby release the axle 89 and permit movement of the lever 83. Thus, locking and unlocking of the lever 83 may be accomplished by manipulation of the control lever 69.

With renewed reference to FIGS. 10 and 6, it may be seen that the retraction housing 25 is secured to the main frame 1 proximate the winding shaft 54 and the pedal crank assembly 5, at flanges 24. A portion of the housing 94 is hinged, as shown in FIG. 2, at position 95 and removably fastened by means of a bolt 96 to the housing. The resilient gasket 97 is provided, as previously noted, for sealing the connection between the end cap 21 and the housing 25.

The kinematics of the retraction system may be understood by reference to FIGS. 2, 4, 5, 10, 12, and 13. The lever 83 is fixed for rotation with the winding shaft 54 and is pivotally connected at 99 to a ratchet rod 98. The ratchet rod 98 is biased by spring 100 rightwardly, as shown in FIG. 2 and in FIG. 5, to urge the lever 83 into counterclockwise rotation. The spring 100 is fixed to the housing 25 by convenient means at a point 101. One of the ends of the ratchet rod 98 (which is actually two, parallel disposed elements as shown clearly in FIG. 5) is pivotally connected at 103 to a ratchet lever 102. The ratchet lever is pivotally connected to the housing at point 104. Fixed to the ratchet lever 102 is a pawl 105 adapted for engagement with final gear means 53 and permitting only counterclockwise rotation thereof. The pawl 105 is pivoted on the ratchet lever at a point 106 and is slotted at 107 to receive a stop 108 which is fixed to the ratchet lever 102. The stop 108 limits the movement of the pawl 105 under the urging of spring 109, which is attached to the ratchet lever.

The pawl and ratchet lever assembly prevents clockwise rotation of final gear means 53 with consequent winding of the winding shaft 54 and its associated drum, when the control lever 69 is rotated in a clockwise direction, as shown in FIG. 9, so as to pull the lever 83 upwardly, as shown in FIG. 2. However, rotation of the final gear means in either clockwise or counterclockwise direction may be accomplished when the control lever 69 is rotated in a counterclockwise direction, as shown in FIG. 9, and the lever 83 has been permitted to descend under the influence of the spring 100.

With further reference to FIGS. 2 and 10, the pinion gear 52 rotates upon an axle 110 which is, in turn, attached to a radial arm 111 which is pivotal about the winding spindle 54. This is also clearly shown in FIG. 4. At its lower end radial arm 111 projects forward and is thickened to insure maintenance of space between radial arm 111 and lever 83 and to so eliminate potential binding. The radial arm 111 is connected at axle 110 to the pinion gear rod 112. Spring means 113 are connected to the pinion gear rod 112 around an axle 114 and are secured at location 115 to the housing 25. Spring means 113 constantly bias the pinion gear rod rightwardly, as shown in FIG. 2. The axle 114 extends axially outwardly beyond the lateral confines of the pinion gear rod elements 112 on each side thereof and is slidable within housing slot means 116.

Engagement lever means 117 are pivotal about the axle 114 and are shaped and dimensioned to permit selective engagement with ratchet rod 98. The engagement lever is biased into engagement with the ratchet rod by means of a spring 118, which is attached to a foot portion of the lever at a point 119 and which is fixed to the housing 25 at 120.

With reference to FIG. 4, it may be seen that a slot 117a is formed in foot portion of the engagement lever so that the spring 100 may pass freely therethrough. Engagement lever 117 also includes a projection 121 which extends through the space between the lever elements 112 and ratchet rod 98, as well as through an opening in the housing 25, as best shown in FIG. 2.

Figure 13:
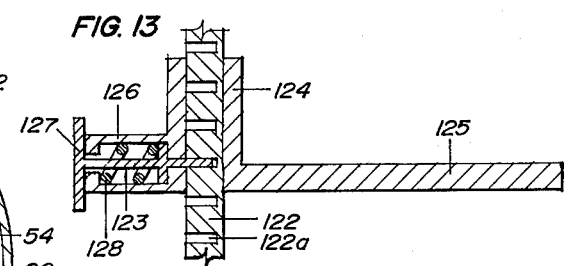
FIG. 13 is a sectional view of the mechanism shown in FIG. 12 taken along the line H in FIG. 12.
Figure 12:
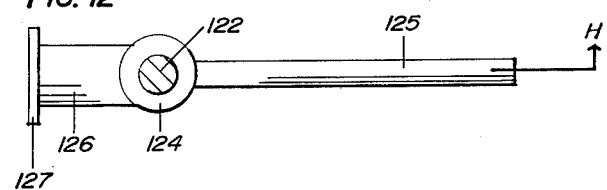
FIG. 12 is a sectional view of the disengagement trigger mechanism taken along the line G in FIG. 10.

An extension portion 122 is attached to the trailing arm 26, as best shown in FIG. 10. With reference to FIGS. 12 and 13, it may be seen that the extension portion 122 is drilled along its length to receive shaft means 123. A cylinder 124, slidably receives cylindrically shaped extension 122 and is affixed with a rod 125 and a barrel means 126. The shaft 123 is fitted through an opening in the end of barrel 126 and is connected to a disc 127. A spring 128 constantly biases the shaft into engagement with a plurality of notches 122a in the extension 122.

It may be readily appreciated that manipulation of disc 127 is sufficient to effect withdrawal of shaft 123 from notches 122a, thereby allowing movement of cylinder 124 along extension 122 and subsequent reengagement of shaft 123 with higher or lower notches 122a. Thus, the position of rod 125 with respect to trailing arm 26 can be simply and securely adjusted. As discussed below, this adjustment effectively changes the final height to which the trailing arm 26 is raised by the retraction mechanism.

These assemblies, which together comprise the retraction system, provide automatic coupling of the engagement lever 117 and the ratchet rod 98 when the ratchet rod moves to a rightward position, as shown in FIG. 2. Leftward movement of the ratchet rod 98 produces leftward movement of the pinion gear rod 112 and the pinion gear 52 is moved into contact with the primary gear means 44.

As retraction cable 55 is wound about the winding spindle 54, the trailing arms 26 are caused to rise. At a predetermined height, the rod 125 causes the projection 121 to move sufficiently to uncouple the engagement lever 117 and the ratchet rod 98. The engagement lever 117 and the associated pinion gear rod 112 are pulled rightwardly, in FIG. 2, by the bias of spring 113. Such movement eventually disconnects the pinion gear 52 and the primary gear 44, but does not disconnect the pawl 105 from the final gear 53. Thereafter, while the rider of the vehicle may continue to pedal the pedal crank and drive the traction wheel 28, such traction wheel will not rise or fall until the control lever 69 is rotated counterclockwise, as shown in FIG. 9.

FIGS. 23, 24, 25 and 26 illustrate alternative systems for retracting the traction wheel 28 in response to rotation of the winding shaft 54. In each case, the crank assembly is shown schematically at 5, the trailing arms at 26 and the main frame portions at 1.

In FIG. 23, a sprocket wheel 129 is fixed for rotation with the winding shaft 54. A sprocket wheel 130, which is rotatably mounted upon a shaft 131 is attached to the main frame by means of brackets 132. A pinion gear 133 is secured to the shaft 131. A chain 134 engages the sprocket wheels 129 and 130. A rack means 135 is fastened to the trailing arm 26 and is arranged for meshing engagement with the pinion gear 133. Upon rotation of the winding shaft 54, movement is translated through the chain 134 to the pinion gear 133, which meshes with the rack and lifts the trailing arms and traction gear to any desired height.

In FIG. 24, a system similar to that illustrated in FIG. 23 is shown, but the sprocket wheels 129 and 130 are attached to the trailing arm 26 and the rack 135 is attached to the main frame 1.

In the embodiment shown in FIG. 25, a bevel gear 136 rotates with the winding shaft 54 and a shaft 137 is secured to the main frame 1 by means of brackets 138. Bevel gear 139 is attached to the shaft 137 and is arranged to mesh with a rack 140 which is attached to the trailing arm 26.

In the arrangement shown in FIG. 26, as opposed to the arrangement of FIG. 25, the bevel gear 136 and shaft 137 are secured to the trailing arm 26 and the rack 140 is attached to the main frame 1.

It should be noted that the embodiments shown in FIGS. 24 and 26, the wheel retraction mechanism from which the systems are powered must be moveably attached for movement with the trailing arms 126.

With concurrent reference now to FIGS. 27-31, the braking means for the instant velocipede will be explained.

Braking of the vehicle is controlled by two levers 141 which are mounted on the steering handle 4, as shown in FIG. 1, and which operate independently the front and rear brake assemblies shown generally at 142. The levers are respectively connected by means of brake cables 143 which are coaxially received by flexible tubes 144, which tubes are attached to the vehicle frame in the conventional manner.

Figure 27:
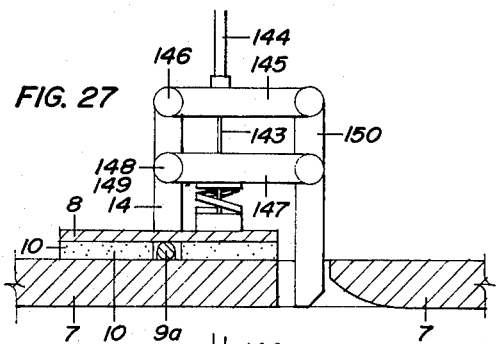
FIG. 27 is a detailed, partially sectioned elevational view of a braking system for the instant velocipede.

In the alternate brake assemblies 142 shown in FIGS. 27 through 31, the preferred system is depicted in FIG. 27. In this arrangement, the upper elements 145 are pivotally connected by means of shafts 146 to vertical posts 14. Horizontally disposed elements 147 are pivotally connected to the vertical posts at points 148. A braking element 150 is pivotally connected to the upper elements 145 and to the lower elements 147 as shown and a spring means 149 is connected between the plate member 18 and the lower elements 147 to bias the elements 147 upwardly as shown in FIG. 27. The flexible tubing 144 is secured to the upper elements 145 and the brake cable 143 passes through the upper elements 145 and lower elements and is fixed to the plate 8. The braking element 150 extends through an opening 151 in ski 7 for selective engagement with the riding surface.

Figure 28:
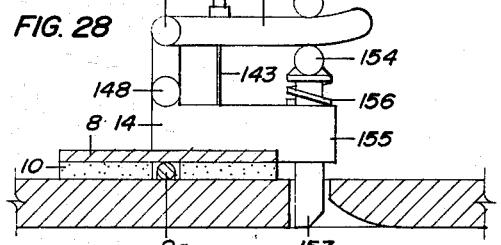
FIGS. 28, 29, 30, and 31 are similar side elevations of alternative braking systems.

The embodiment of FIG. 28 consists of a lever 152 which is pivotally connected to the vertical posts 14 via a shaft 146. A braking element 153 is fitted at its upper portion with rollers 154 and extends through a sleeve means 155 which is secured to plate 8. Compression spring 156 circumnavigates the braking element 153 and biases the rollers 154 away from the sleeve 155. As is apparent, the rollers 154 transmit any movement of the braking lever 152 under the influence of the cable 143 to the braking element 153.

Figure 29:
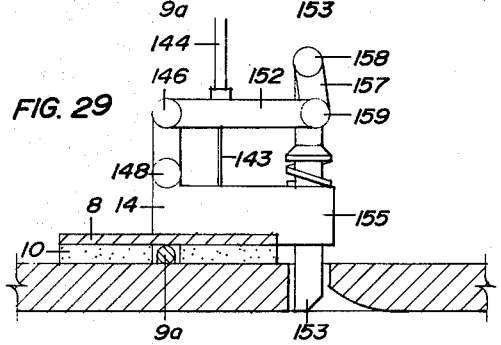

In FIG. 29, the assembly is similar to that shown in FIG. 28 except that movement of the lever 152 is transmitted to braking element 153 by means of a link 157 which is pivotally connected to the braking element 153 at a point 158 and to the lever 152 at a point 159.

Figure 30:
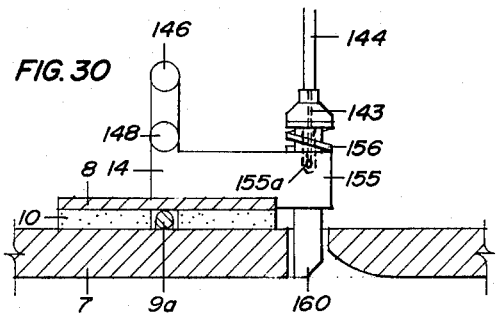

In FIG. 30, the assembly consists of a sleeve 155 secured to the plate 8 and a spring 156 downwardly biasing a braking element 160. The element 160 receives the flexible tube 144 at its upper portion and it is slotted so as to provide passage for the brake cable 143 and attachment thereof to a shaft 155a which is fixed at either end to the sleeve 155.

Figure 31:
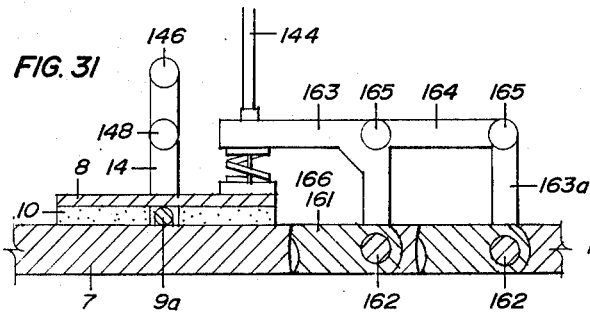

Finally, in the system shown in FIG. 31, the ski sections 161 are pivotal upon axles 162. Lever 163 is rigidly secured to the leftmost ski section and levers 163a are similarly secured to additional ski sections 161. An element 164 pivotally connects levers 163 and 163a at pivot points 165. A spring 166 is disposed between the lever 163 and the plate 8. The flexible tubing 144 is received by the lever 163 and the brake cable 143 is secured to the plate 8.

The preferred system for steering the vehicle is illustrated generally in FIG. 1. It includes the direct transmission of turning forces from the steering bar 4 to the front ski only.

Figure 42:
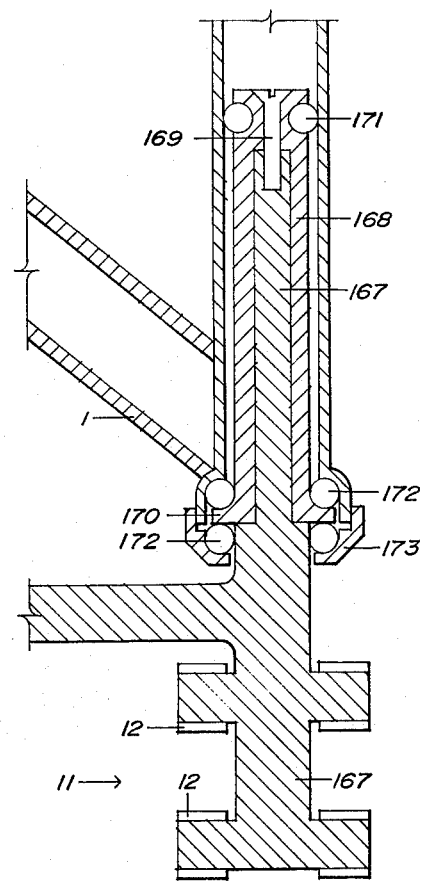
FIG. 42 is a detailed sectional view of components of all the alternative rear ski steering systems shown.

However, the vehicle may be equipped with steerable rear skis, in which case the assemblies illustrated in FIGS. 37–47 are adapted to fulfill that function. In all of the systems, a rotation of the steering systems 3 concurrently affects rotation of the front ski and the rear skis of the vehicle. Also common to all of the rear steering systems is the physical connection between the rear suspension system 11 and the main frame 1, as shown in FIG. 42. In the embodiment shown in that figure, the suspension arms 12 are pivotally connected to a shaft 167 which extends into the main frame 1. Sleeve means 168 coaxially circumscribe the shaft 167 and are held in place by means of a screw 169. A lower flange 170 extends from the sleeve 168 and said sleeve provides an upper race for bearings 171. Bearings 172 are fitted on either side of the flange 170 and are held in place by an end cap 173. With this system, rotation of the entire rear suspension system 11 and the rear skis 7 relative the main frame 1 can be affected. It may be noted that the shaft 167 may be provided with a plurality of protrusions which control the rotation of the shaft.

Figure 37:
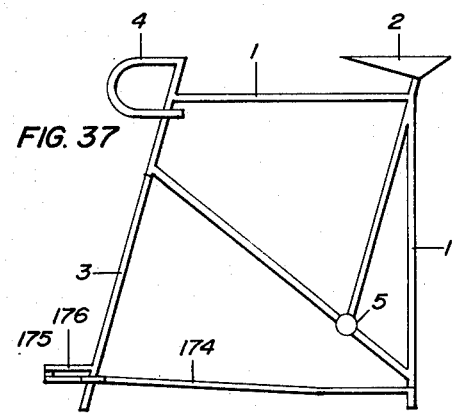
FIGS. 37, 39, and 43 are partial elevations of rear ski steering systems for the instant velocipede.

FIGS. 37 and 38 illustrate a rear steering system in which an arm 174 is connected to shaft 167 in a manner which provides that lateral movement of the arm 174 results in rotation of the shaft 167. The arm 174 extends to a sliding connection at point 175 with an arm 176, which arm is connected to the steering spindle 3 such that rotation of the steering spindle produces lateral movement of the arm 176. The arm 174 is provided with slot means 177 which allows passage therethrough of the steering spindle 3.

Figure 39:
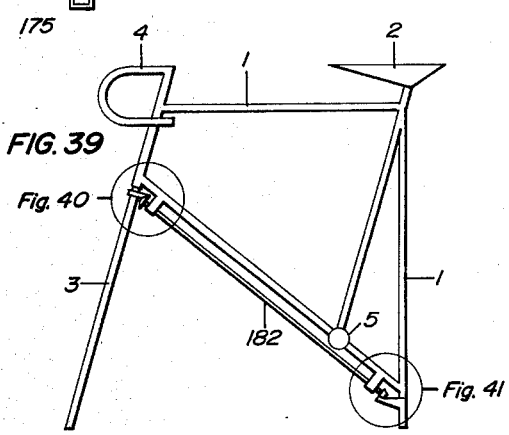
Figures 40, 41:
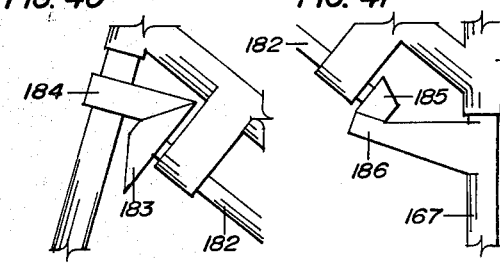
FIGS. 40 and 41 are detailed views of the steering system shown in FIG. 39.

In the embodiments shown in FIGS. 39, 40 and 41, the steering system includes a drive shaft 182 which is mounted upon the main frame 1. A gear 183 which is attached to the upper end of the drive shaft 182, meshes with a rack 184, which rack is rigidly affixed to the steering spindle 3. A gear 185, which is attached to the lower end of the drive shaft 182, meshes with a rack 186 which is rigidly connected to the drive shaft.

Figure 43:
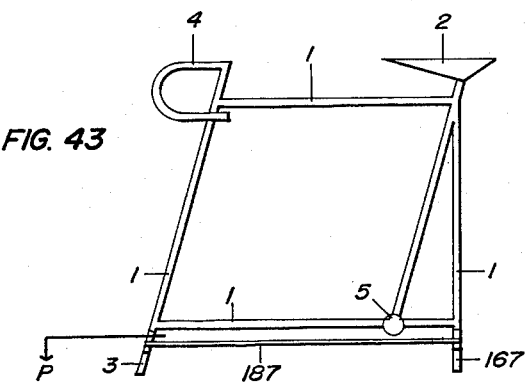
Figure 44:
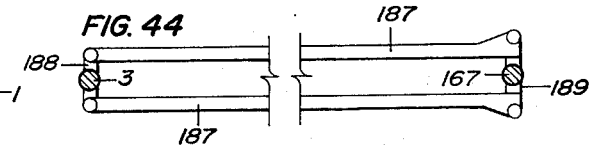
FIG. 44 and 45 are alternative plan views of FIG. 43, viewed generally along the line Q in FIG. 43.

In the embodiment shown in FIGS. 43 and 44, a rear steering system includes parallel rods 187 which are pivotally connected at their forward ends to arms 188, which arms are rigidly connected to the steering spindle 3. At their opposite end portions, the rods 187 are pivotally connected to arms 189, which arms are rigidly connected to shaft 167.

Figure 45:
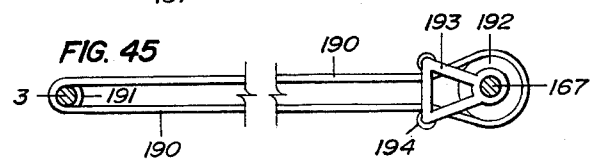

In the embodiment shown in FIG. 45, similar in elevation to that shown in FIG. 43, the sprocket 191 is rigidly attached to the steering spindle 3. Movement of the sprocket 191 is transmitted via the chain 190 to sprocket 192 which is rigidly attached to the shaft 167. A triangular element 193 is pivotally connected at one apex thereof to the shaft 167. The element 193 provides attachment points for sprockets 194 at its other apexes. Sprockets 194 limit the width of the chain loop as clearly shown in the drawing.

Thus, the preferred embodiments and alternatives thereto have been illustrated and described. It must be clearly understood that such embodiments are capable of many variations and modifications and are not limited to the precise details set forth. For example, although the preferred embodiment is powered by the rider, it may be readily appreciated that a suitable motor can be mounted on the main frame and can be coupled in a known manner for transmitting driving power to the crankshaft 5. This invention includes all such variations and modifications as fall within the scope of the appended claims.

I claim:

1. A vehicle for travel over ice or snow covered terrain including supporting frame means, and terrain engaging means mounted upon said frame means, steering means for controlling the direction of travel of said vehicle, braking means for slowing said vehicle, traction means for propelling said vehicle upon said terrain, retraction means for moving said traction means into and out of engagement with said terrain, drive means for transmitting power to said traction means to propel said vehicle, said drive means also transmitting motive power to said retraction means for operation thereof, and control means for selectively bringing said retraction means into and out of driving engagement with said drive means, said drive means including a crankshaft and said retraction means being powered by rotation of said crankshaft in a first direction and said retraction means being non-responsive to rotation of said crankshaft in a direction opposite to said first direction, said retraction means preventing movement of said traction means into or out of engagement with said terrain in response to movement of said crankshaft in said opposite direction.

2. The invention of claim 1 wherein said retraction means include retention means for automatically maintaining retraction of said traction means away from said terrain, said maintenance of retraction occurring only when said control means have been operated so as to bring said retraction means into driving engagement with said drive means.

3. The invention of claim 2 wherein said retraction means include trigger means for automatically discontinuing retraction of said traction means at a predetermined point in the retraction process, said trigger means being independent of said retention means, and said trigger means being independent of the transmission of power to said traction means.

4. The invention of claim 3 wherein said control means include locking means, operation of said control means to engage said drive means with said retraction means also moving said locking means to a locked position, said locking means when in said locked position preventing movement of said retention means toward an inoperative position, said locking means in said locked position also preventing movement toward disengagement of said drive means from said retraction means except when said trigger means is operated in response to the attainment of a predetermined degree of retraction of said traction means, operation of said control means to disengage said drive means from said retraction means moving said locking means to an unlocked position, said locking means in said unlocked position freeing said retention means to move to an inoperative position, permitting the disengagement of said drive means from said retraction means by said control means.

5. The invention of claim 4 wherein said control means include a manually operated control mechanism and an intermediate mechanism responsive to operation of said control mechanism for selectively engaging or disengaging said drive means to respectively transmit or discontinue the transmission of driving power to said retraction means, said control mechanism being connected to said intermediate mechanism by flexible cable means, said flexible cable also connecting said control mechanism with said locking means.

6. A vehicle for travel over ice or snow covered terrain including supporting frame means, and terrain engaging means mounted upon said frame means, steering means for controlling the direction of travel of said vehicle, braking means for slowing said vehicle, traction means for propelling said vehicle upon said terrain, retraction means for moving said traction means into and out of engagement with said terrain, drive means for transmitting power to said traction means to propel said vehicle, said drive means also transmitting motive power to said retraction means for operation thereof, and control means for selectively bringing said retraction means into and out of driving engagement with said drive means, said control means including a manually operated control mechanism and an intermediate mechanism responsive to operation of said control mechanism for selectively engaging or disengaging said drive means to respectively transmit or discontinue the transmission of driving power to said retraction means, said control mechanism being connected to said intermediate mechanism by flexible cable means, operation of said control means being independent of transmission of propelling power to said retraction means.

* * * * *